United States Patent
Chen

(10) Patent No.: US 7,718,208 B2
(45) Date of Patent: May 18, 2010

(54) VACUUM SKIN PACKAGING STRUCTURE WITH HIGH OXYGEN PERMEABILITY

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/613,560

(22) Filed: Nov. 6, 2009

(65) Prior Publication Data

US 2010/0055275 A1    Mar. 4, 2010

Related U.S. Application Data

(62) Division of application No. 11/184,144, filed on Jul. 19, 2005, now Pat. No. 7,635,509.

(51) Int. Cl.
| | |
|---|---|
| *B65D 77/20* | (2006.01) |
| *B65D 25/00* | (2006.01) |
| *B65B 11/52* | (2006.01) |
| *B65B 25/06* | (2006.01) |
| *B32B 27/08* | (2006.01) |

(52) U.S. Cl. ............... 426/396; 426/124; 426/127; 426/129; 426/392; 426/398; 426/415; 426/418; 426/419; 53/427

(58) Field of Classification Search ............... 426/124, 426/127, 129, 392, 396, 398, 415, 418, 419; 53/427, 509, 434, 512, 449, 171; 428/34.1, 428/34.8, 35.2, 35.3, 35.4, 35.5, 35.7, 35.8, 428/35.9, 36.5, 36.6, 36.7, 36.9, 36.91, 36.92

See application file for complete search history.

(56) References Cited

U.S. PATENT DOCUMENTS

| | | |
|---|---|---|
| 4,335,175 A | 6/1982 | Webb |
| 4,685,274 A | 8/1987 | Garwood |
| 4,840,271 A | 6/1989 | Garwood |
| 5,025,611 A | 6/1991 | Garwood |
| 5,028,674 A | 7/1991 | Hatch et al. |
| 5,103,618 A | 4/1992 | Garwood |
| 5,115,624 A | 5/1992 | Garwood |
| 5,916,613 A | 6/1999 | Stockley, III |
| 6,066,404 A | 5/2000 | Suzuura et al. |
| 7,422,796 B2 | 9/2008 | Chen |
| 2003/0050373 A1 | 3/2003 | Chen |
| 2003/0198715 A1 | 10/2003 | Morris et al. |

FOREIGN PATENT DOCUMENTS

| | | |
|---|---|---|
| EP | 1097810 A2 | 5/2001 |
| WO | 02/072347 A2 | 9/2002 |
| WO | 03/089240 A1 | 10/2003 |
| WO | 2004/043155 A2 | 5/2004 |
| WO | 2005/087613 A1 | 9/2005 |

*Primary Examiner*—Rena L Dye
*Assistant Examiner*—Walter B Aughenbaugh

(57) ABSTRACT

Disclosed are improved packages and methods for packaging meat, fish, poultry, vegetables or other food products. A package of the present invention is a vacuum skin package comprising a multilayer film comprising at least one layer of an organic acid modified ionomer blend and at least one layer of an ethylene-containing polymer, such as an ethylene/vinyl acetate copolymer, wherein the film has specific gas permeability requirements.

6 Claims, No Drawings

VACUUM SKIN PACKAGING STRUCTURE WITH HIGH OXYGEN PERMEABILITY

This application is a divisional application of U.S. application Ser. No. 11/184,144, filed Jul. 19, 2005, now U.S. Pat. No. 7,635,509.

BACKGROUND OF THE INVENTION

1. Field of the Invention

This invention relates to a vacuum skin package comprising a gas permeable film having specific permeability requirements. This invention particularly relates to improved packaging structures for perishable food products.

2. Description of the Related Art

Perishable food products are subject to contamination when exposed to microbial organisms such as bacteria, molds and the like. Contamination can result in accelerated spoilage, toxin formation and other harmful effects. Packaging such perishable goods in gas impermeable materials such as foil, coated paperboard and oxygen barrier films can provide a barrier to microbial contamination. However, anaerobic organisms such as *C. botulinum*, which produces a potent toxin that is the causative agent of botulism, thrive in oxygen-depleted atmospheres. Gas impermeable materials such as foil, paperboard and oxygen barrier films are not suitable to package goods highly susceptible to botulin toxin formation.

*C. botulinum* contamination is particularly problematic in fresh fish. Packaged fresh fish is typically frozen for this reason. To avoid problems associated with storing, shipping and merchandising fresh fish, packages suitable for protecting fresh fish can be desirable.

Vacuum packaging is a process used to protect perishable items from deterioration wherein a vacuum is applied to a package to actively remove air to conform the packaging film to the shape of the content prior to sealing the package. Skin packaging is a known technique where goods are tightly packaged within a wrapping material and where substantially all of the atmospheric air is excluded. Vacuum skin packaging is a combination of the two packaging processes. However, conventional packaging of this type excludes oxygen and therefore does not inhibit the growth of *C. botulinum*.

It has been known to include certain gases in packaging to enhance the storage stability of the contents and increase the shelf life. Packages can be made with gas impermeable materials if oxygen is available in the headspace of the package to inhibit growth of anaerobic organisms. However, it is difficult to provide sufficient oxygen in the headspace of such a package to provide extended protection against growth of anaerobes.

The U.S. Food and Drug Administration (FDA) guidelines state that packages having an oxygen transmission rate (OTR) greater than or equal to 10,000 cc/m$^2$/24 hr meets the guidelines for being "oxygen permeable". Unless a package is considered oxygen permeable by the FDA a "Hazard Analysis of Critical Control Points" (HACCP) plan must be established. Under a HACCP plan temperature monitoring is required and time/temperature indicators (TTI's) must be provided on shipping containers. Temperature monitoring protocols alone may not be sufficient in protecting food from spoilage. A further problem is that meeting the FDA OTR guidelines is not possible using conventional foam trays currently used to package foodstuffs such as fresh meats.

To add to the complexity of packaging perishable foods such as fish, it can be desirable to maintain the moisture level in the food. Fish can be packaged in trays with raised areas for the fish to rest on, allowing oxygen to contact the bottom of the fish. However, trays of this type allow liquid to drain from the fish. Films having high moisture permeability allow moisture to escape from the package, resulting in dehydration of the product and lower quality.

U.S. Pat. Nos. 4,685,274; 4,840,271; 5,025,611; 5,103,618 and 5,115,624 describe packages, methods, and apparatuses for packaging perishable goods. U.S. Pat. App. Pub. 2003/0198715 A1 discloses films and packages of highly neutralized blends of organic acids and ethylene acid copolymers having good oxygen permeability.

It can be desirable to prepare packages having high oxygen permeability and low moisture permeability for packaging perishable food items.

SUMMARY OF THE INVENTION

In one aspect, the present invention is a package comprising multiple layers of film, wherein the package comprises:

(i) at least one oxygen-permeable layer, wherein the layer is obtained from a blend comprising:

a) one or more aliphatic organic acids or salts thereof having fewer than 36 carbon atoms;

(b) at least one E/X/Y copolymer (ethylene acid copolymer) wherein E is derived from ethylene, X is derived from at least one $C_3$ to $C_8$ $\alpha,\beta$-ethylenically unsaturated carboxylic acid, and Y is derived from a comonomer selected from alkyl acrylate and alkyl methacrylate, wherein the alkyl groups have from 1 to 8 carbon atoms, or ionomers of said E/X/Y copolymers, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized to the corresponding metal salts; and (c) at least one additional ethylene-containing homopolymer and/or copolymer; and (ii) at least one polymeric film layer consisting essentially of at least one ethylene-containing polymer or a mixture of ethylene-containing polymers;

and wherein the package is made by a process comprising the steps of removing air from the package and sealing the package.

The Applicant has discovered that a film obtained from a blend comprising at least one neutralized organic acid, at least one highly neutralized copolymer of ethylene and an $\alpha,\beta$-ethylenically unsaturated carboxylic acid (ethylene acid copolymer ionomer) and one or more ethylene-containing polymers can achieve improved oxygen transmission properties when compared with films obtained from similar compositions consisting essentially of neutralized organic acid and highly neutralized ethylene acid copolymer ionomer that do not include additional ethylene copolymers, or with films obtained from ionomeric copolymers alone. In addition, a film formed from a blended composition described herein has improved processability and provides an improved moisture barrier relative to films of similar composition that do not include ethylene containing copolymers. Film layers comprising these acid-modified ionomer blend compositions, optionally in combination with other highly permeable film layers such as ethylene/vinyl acetate copolymers provide breathable film structures. These blended compositions provide film structures having a combination of improved oxygen permeability and restricted water vapor transmission, in addition to good formability and structural strength to support the weight of the content without deformation. Films comprising the blends described herein can be useful in packaging food products requiring breathable films such as case ready meat, fish, sausage, fresh produce, and the like.

DETAILED DESCRIPTION OF THE INVENTION

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present).

As used herein, the phrases "inside face", "inside layer", or "innermost" layer refers to the face or layer of a film or packaging web that is in contact with the packaged goods , and the phrase "outside face" or "outer layer" refers to the face of a film or packaging web not in direct contact with the packaged article and which provides the exterior surface of the package after it is formed.

Perishable goods that can be packaged according to this invention include meat, fish, poultry or fresh vegetables, as well as other perishable goods. Films as described herein provide a combination of high oxygen permeability and low moisture permeability and are particularly well suited for packaging perishable food products subject to spoiling in an anaerobic atmosphere, and/or deteriorating due to dehydration or require high breathability to maintain freshness and the appearance of freshness.

In one embodiment, the present invention is a vacuum skin package suitable for storage of perishable food items by providing oxygen at the surface of the packaged food item. A vacuum package of the present invention includes at least one film layer comprising a blend described herein, and is particularly useful for packaging fresh fish.

In some packaging applications described herein carbon dioxide, oxygen, and/or nitrogen can be selectively introduced into the container after air has been excluded. This packaging technique can conventionally be referred to as modified atmosphere packaging and/or controlled atmosphere packaging. These packaging processes can be utilized in combination with vacuum packaging processes described herein. Packaging of the present invention also contemplates drawing a vacuum on a package comprising an oxygen-permeable film of the type described herein. It can therefore be appreciated by one of ordinary skill in the art that a vacuum package of the present invention is not a package wherein a complete vacuum can be obtained and/or maintained due to the gas permeability of the inventive film layer.

A multilayer film comprising a barrier layer and a breathable layer or multi-film structure comprising a barrier film layer and a breathable film layer comprising a composition described herein optionally can be sealed to a preformed barrier tray. The barrier and breathable films or layers are physically separable from each other. The barrier film and the breathable film can be multi-laminate. In this particular embodiment the interior of the package can be flushed with a selected gas or gas mixture. The barrier film protects the contents of the package and maintains the selected gas atmosphere during storage and distribution. The barrier film can be peeled at the retail location, to expose the breathable film and allow air to enter the package. In the case of packaged red meat the air causes the meat to bloom to the desired bright red color.

In another embodiment of vacuum packaging according to the invention, a plurality of packages of the present invention are placed in a pouch, or bag, that provides an impermeable gas barrier to the contents of the bag, and which is sometimes referred to as a "master bag". A controlled atmosphere or vacuum can be preserved inside the master bag. By "controlled atmosphere" it is meant that a selected gas or gas mixture, such as for example nitrogen, oxygen or carbon dioxide or another inert gas such as argon, or a nitrogen-rich mixture can be used to fill the bag prior to sealing the bag. Other gasses can be used for various purposes. At the retail location the gas permeable vacuum packages can be removed from the master bag to enable the atmospheric oxygen to permeate into the packages.

A film or sheet comprising the oxygen permeable compositions of the present invention can be further processed by thermoforming said sheet into a shaped article.

As described herein, the packages can comprise at least two gas permeable film webs. The at least two film webs can be individual sheets of film. The webs can be identical or different. For example, one web can be clear, allowing visualization of the packaged goods and the other can be opaque and/or colored to provide a background. One or both of the webs may also be printed with designs, logos, alphanumeric text and/or the like to provide a pleasing appearance for the package and/or to provide information to the consumer. One skilled in the art will appreciate that a single web of film can be folded onto itself to provide two overlying webs, or a tube of film may be formed such that two overlying portions of the tube provide the equivalent of two webs of film.

The article to be packaged can be placed between the at least two film webs, vacuum applied to the package, and a seal formed by adhering—preferably by heat sealing—the perimeters of the two webs together. It should be appreciated that the process of sealing the perimeter of the package can be any process that is known or conventional, for example, by heat sealing two film webs indirectly through the use of an intervening third polymeric film, or any process that may be developed for forming a sealed package. In some cases, a shaped packaging web can be combined with a flat web to form a package of this invention.

Various embodiments of the present invention can be envisioned, providing at least one film layer comprising an organic acid modified ionomer blend as described herein with at least one other layer comprising other materials suitable for use herein. The various combinations are not limited by the examples provided or described herein. One of ordinary skill in the art would be able to construct suitable film structures from the teachings provided herein.

This invention provides packages that allow perishable goods such as fresh fish to be packaged such that they are readily exposed to oxygen on all surfaces, thus inhibiting anaerobic growth of micro-organisms. When packaging goods such as fish, it is also possible to retain the usual drip liquid within the fish but to allow for oxygen to permeate through the oxygen permeable film.

For good appearance of the package for retail display, it can also be desirable that films used in the practice of the present invention offer suitable stiffness to resist stretching under the weight of the packaged goods, that is, the film resists creep.

Oxygen transmission rates (OTR) of films are dependent on the thickness of the film and the inherent permeability of its composition. Permeability is dependent on such factors as temperature, relative humidity and pressure of the gas impinging on the film. Typically OTR is determined using standard conditions normalized to 23° C., 50% relative humidity and 1 atmosphere. Oxygen permeability values (OPV) are OTR values normalized to 1 mil, and thus can be used to predict expected OTR at specific film thicknesses.

The present invention provides an improvement in the OPV of previously described films obtained from ethylene acid copolymer/organic acid blends. It has been discovered that there can be a synergistic effect when an ethylene-containing copolymer (that is neither an ethylene acid copolymer nor an ionomer) is blended with a neutralized acid copolymer/organic acid blend, particularly with respect to the OPV. It has been found that inclusion of the ethylene-containing copolymer can improve OPV even though the level of E/X/Y terpolymer is reduced. That is, a blend comprising a neutralized copolymer of ethylene and an $\alpha,\beta$-ethylenically unsaturated carboxylic acid/organic acid blend with an ethylene-containing copolymer can provide OTR of greater than 10,000 cc/m$^2$/24 hr. In addition to improving the OTR of films of the present invention, the ethylene copolymer blends of the present invention provide good moisture barrier properties, and show improved processability relative to similar blends wherein the ethylene-containing copolymer is absent.

The organic acids employed in the present invention are aliphatic, mono-functional (saturated, unsaturated, or multi-unsaturated) organic acids, particularly those having fewer than 36 carbon atoms. Also salts of these organic acids may be employed. The organic acid salts are preferably magnesium or calcium salts, however other salts can be used as long as the concentration of other salts does not negate the property of oxygen permeability in a film of the present invention. Other salts can be any of the alkaline earth metals, including the barium or strontium salts, for example.

While it may be useful for the organic acids (and salts) to have a low volatility when being melt-blended with acid copolymer or ionomer, it has been discovered that volatility is not a limiting factor when neutralizing the blend to high levels, particularly near to or at 100%. As such, organic acids with lower carbon content can be used in the practice of the present invention. It can be preferred, however, that the organic acid (or salt) be non-volatile and non-migratory. By non-volatile, it is meant that they do not volatilize in the range of temperatures useful for melt blending the acid copolymer as described herein. By non-migratory, it is meant that the organic acid does not bloom to the surface of the polymer under normal storage conditions (ambient temperatures). Added acids as described herein effectively modify the ionic morphology and/or remove ethylene crystallinity from ethylene/C$_{3-8}$ $\alpha,\beta$-ethylenically unsaturated carboxylic acid copolymers or ionomers thereof. Particularly useful organic acids include acids having from four to 34 carbons, more preferred are C$_6$ to C$_{26}$ acids, and even more preferred are C$_6$ to C$_{22}$ acids. Organic acids useful in the practice of the present invention include, but are not limited to, caproic acid, caprylic acid, capric acid, palmitic acid; lauric acid, stearic acid, isostearic acid, behenic acid, erucic acid, oleic acid, and linoleic acid and their mixtures. More preferably, the naturally derived organic fatty acids such as palmitic, stearic, oleic, behenic, and mixtures thereof can be conveniently employed. Saturated organic acids can be preferred for the purpose of reducing organoleptic properties of the films. Stearic acid can be preferred.

Saturated, branched organic acids can be particularly preferred to provide greater oxygen permeability. Of the branched saturated acids, particularly preferred is isostearic acid. One of ordinary skill can appreciate that mixtures of any of the organic acids contemplated herein can provide properties that can be expected or anticipated from the properties of the individual organic acid components.

Optional antioxidant additives can be useful in modifying the organoleptic properties (e.g. reducing odor or taste) of the blends of organic acid and ethylene copolymers used in this invention. Antioxidants may be preferred when the organic acid is unsaturated. Antioxidants are available under the trade name Irganox as from Ciba Geigy Inc. Tarrytown, N.Y. For example, phenolic antioxidants such as IRGANOX E201, CAS Number 10191-41-0) or its derivatives may be added to the blend. IRGANOX 1010 is another antioxidant suitable for use in this invention. Thus, this invention provides packages and packaged food products wherein the blends of (a), (b) and (c), as defined above, further comprise an antioxidant.

Acid Copolymers/Ionomers

Acid copolymers used in the present invention to make the ionomers are preferably "direct" acid copolymers. They are preferably alpha olefin, particularly ethylene, C$_{3-8}$ $\alpha,\beta$-ethylenically unsaturated carboxylic acid, particularly acrylic and methacrylic acid, copolymers. They may optionally contain a third monomer that can disrupt the crystallinity.

The acid copolymers can be described as E/X/Y copolymers where E is ethylene, X is the $\alpha,\beta$-ethylenically unsaturated carboxylic acid, and Y is a comonomer. X is present in from 3 to 35 (preferably from 4 to 25, more preferably from 5 to 20) weight % of the polymer, and Y is present in from 0 to 35 weight %, preferably from 1 to 35 weight, more preferably from 4 to 25 of the polymer. Notable are E/X dipolymers, wherein Y is 0 weight % of the E/X/Y copolymer.

Suitable third comonomers are monomers selected from alkyl acrylate, and alkyl methacrylate, wherein the alkyl groups have from 1 to 8 carbon atoms. Preferred alkyl acrylate, and alkyl methacrylates are those wherein the alkyl groups have from 1 to 4 carbon atoms, and more preferred are those wherein the alkyl groups have from 3 to 4 carbon atoms.

The ethylene acid copolymers with high levels of acid (X) are difficult to prepare in continuous polymerizers because of monomer-polymer phase separation. This difficulty can be avoided by use of "co-solvent technology" as described in U.S. Pat. No. 5,028,674 or by employing somewhat higher pressures than those at which copolymers with lower acid levels can be prepared.

Specific acid copolymers include, but are not limited to: ethylene/(meth)acrylic acid dipolymers; ethylene/(meth)acrylic acid/n-butyl (meth)acrylate terpolymers; ethylene/(meth)acrylic acid/iso-butyl (meth)acrylate terpolymers; ethylene/(meth)acrylic acid/methyl (meth)acrylate terpolymers; and ethylene/(meth)acrylic acid/ethyl (meth)acrylate terpolymers.

"(Meth)acrylic acid" as used herein is shorthand notation, and shall be taken to mean "methacrylic acid and/or acrylic acid", that is, methacrylic acid alone, acrylic acid alone, or the combination of both.

Unmodified melt processible ionomers (that is, melt processible ionomers that are not blended with an organic acid component) used in this invention are obtained from acid copolymers by neutralization of same. They include partially neutralized acid copolymers, particularly ethylene/(meth)acrylic acid copolymers. The unmodified ionomers may be neutralized to any level that does not result in an intractable (that is, not melt processible) polymer without useful physical properties.

Ionomers blended with the organic acids described herein (modified ionomers) can be neutralized to any level, particularly levels higher than 70%. For the purposes of this invention, high levels of neutralization (over 70%) can be obtained by adding the stoichiometric amount of a cation source calculated to neutralize the target amount of acid moieties in the acid copolymer and organic acid(s) in the blend (hereinafter referred to as "% nominal neutralization" or "nominally neutralized"). Thus, sufficient cations are made available in the blend so that, in aggregate, the indicated level of nominal neutralization is achieved.

Unmodified ionomers can also be suitable for use as separate layers in a multilayer film of the present invention, and can be neutralized with alkaline or alkaline earth metals, and/or transitions metals. For example, the unmodified ionomers can be neutralized with metals such as lithium, sodium, magnesium, calcium or zinc, or combinations thereof.

In any case, the ionomers useful herein consist essentially of calcium and/or magnesium-neutralized ionomers. Calcium and/or magnesium ionomeric compositions are preferred for restriction of moisture in addition to high oxygen permeability, but other cations can be present, so long as the concentration of said other cations does not rise to the level wherein the oxygen permeability of the resultant films is decreased below about 10,000 $(cc/m^2)(day)(atm)$. Other cations useful in making the highly oxygen permeable blends of this invention include lithium, sodium, potassium, or zinc, or combinations of such cations. In some instances it can be found that use of calcium can be preferred over the use of magnesium, or vice versa. One of ordinary skill in the art can determine what is preferable in a given circumstance.

Fatty Acid Modified Ionomer Blends

Components (a) and (b) of the blends described herein can be neutralized according to the following procedure:

(1) melt-blending ethylene α,β-ethylenically unsaturated $C_{3-8}$ carboxylic acid copolymer(s) and/or ionomer(s) thereof with one or more aliphatic, mono-functional, saturated or unsaturated organic acids having less than 36 carbon atoms or salts of the organic acids, and concurrently or subsequently;

(2) adding a sufficient amount of a cation source to increase the level of neutralization of all the acid moieties (including those in the acid copolymer and in the organic acid) to greater than about 70%, preferably greater than about 80%, more preferably greater than about 90%, and even more preferably from greater than about 91% to about 100%, with the caveat that the ionomer component is melt processible when it is blended with the aliphatic organic acid in step (1). Neutralization of the organic acid can be done to any specific level within the ranges described herein, notwithstanding the specifically defined end-points enumerated herein. One skilled in the art would know that neutralization to any level taught or claimed herein is within the teachings provided here or in the prior art.

Preferably the aliphatic, mono-functional, saturated or unsaturated organic acids having less than 36 carbon atoms or salts of the organic acids are present in a range of from about 5 to about 150 parts, alternatively, from about 25 to about 80 parts per hundred (pph) by weight of the ethylene α,β-ethylenically unsaturated $C_{3-8}$ carboxylic acid copolymer(s) or ionomer(s) thereof. Oleic acid, stearic acid, behenic acid, and isostearic acid can be preferred in the practice of the present invention.

Neutralization of acid copolymers and organic acids in this manner can be preferred. Neutralization of the acid copolymers can be also accomplished using a diluent as the copolymer and organic acid are neutralized. Care should be taken when neutralizing copolymers of the present invention so that there is no loss of desirable properties or difficulties in processing the copolymers. For example, an acid copolymer blended with organic acid(s) can be neutralized to greater than about 70%, preferably greater than about 80%, more preferably greater than about 90% and most preferably from about 91 to about 100% nominal neutralization without losing melt processibility as can occur with acid copolymers, not of this invention, that are neutralized to greater than 70%.

The acid copolymer(s) or unmodified, melt-processible ionomer(s) can be melt-blended with the organic acid(s) or salt(s) by any suitable manner. For example, the solid components can be mixed to obtain a non-homogeneous solid phase mixture of the components can be made and the components can then be melt-blended in an extruder.

The melt-processible, acid copolymer/organic-acid-or-salt blend can be neutralized by methods known in the art. For example, a Werner & Pfleiderer twin-screw extruder can be used to neutralize the acid copolymer and the organic acid at the same time.

Depending on the acid level of the co- or ter-polymer, the level of organic acid that controls processibility can be determined from the teachings provided by the present invention. Generally speaking, and without being held to theory, the percent organic acid may need to be increased when higher acid levels are present in the backbone of the co- or ter-polymer in order to achieve similar melt indices for copolymers having relatively lower acid levels.

In another embodiment the process of the present invention employs an ethylene α,β-unsaturated carboxylic acid copolymer or a melt-processible ionomer thereof that is an E/X/Y copolymer or melt-processible ionomer of the E/X/Y copolymers where E is ethylene, X is the α,β-unsaturated carboxylic acid, and Y is a comonomer. X is present in from 3 to 35 (preferably from 4 to 25, more preferably from 5 to 20) weight % of the polymer, and Y is present in an amount of from 0 to 35 wt %, preferably Y is present from 1 to 35 wt %, and more preferably from 4 to 25 wt % of the polymer.

The present invention contemplates a mixture comprising ionomers of E/X dipolymers (E/X/Y copolymers wherein Y is 0 weight % of the polymer), and/or E/X/Y terpolymers, and/or other E/X/Y copolymers within the ranges specified herein. The composition of the various copolymers, or the molecular weights of the copolymers, can be varied in each copolymer species according to the teachings provided herein and/or in conjunction with the previous teachings in the art to provide properties to the blend that may be desirable in a specific application.

Ethylene-Containing Copolymers

The highly neutralized organic acids and ethylene acid copolymers (ionomers) described above are blended with at least one other ethylene-containing polymer (component (c)) which is selected from ethylene-containing copolymers and/or homopolymers and mixtures thereof. Examples of ethylene-containing polymers suitable for component (c) of the present invention include polyethylene homopolymers and copolymers, including LLDPE, LDPE, ULDPE, metallocene polyethylene (mPE); ethylene propylene copolymers; ethylene/propylene/diene monomer (EPDM) copolymers, etc.;

and ethylene copolymers derived from copolymerization of ethylene and at least one polar comonomer selected from the group consisting of alkyl (meth)acrylate, vinyl acetate, and CO (carbon monoxide).

The term "(meth)acrylate" is shorthand notation for "methacrylate and/or acrylate esters". The term "ethylene/alkyl (meth)acrylate copolymers" is shorthand notation for copolymers obtained from copolymerization of ethylene and alkyl (meth)acrylates. Alkyl (meth)acrylates suitable for use in the practice of the present invention are selected from alkyl (meth)acrylates comprising alkyl groups having from 1 to 8 carbon atoms.

Examples of alkyl acrylates suitable for use herein include methyl acrylate, ethyl acrylate and butyl acrylate. Ethylene/methyl acrylate (EMA) is shorthand notation for a copolymer of ethylene (E) and methyl acrylate (MA). Ethylene/ethyl acrylate (EEA) is shorthand notation for a copolymer of ethylene and ethyl acrylate (EA). Ethylene/butyl acrylate (EBA) is shorthand notation for a copolymer of ethylene and butyl acrylate (BA).

The relative amount of the alkyl (meth)acrylate comonomer incorporated into an ethylene/alkyl (meth)acrylate copolymer of the present invention can vary broadly from a few weight percent up to as high as 45 weight percent of the total copolymer or even higher. Similarly, the alkyl group can be a methyl group or any alkyl group having up to eight carbon atoms. Most preferably, the alkyl group in the alkyl (meth)acrylate comonomer is methyl, ethyl or n-butyl.

Preferably, the alkyl (meth)acrylate comonomer has a concentration range of from 5 to 45 weight percent of the ethylene/alkyl (meth)acrylate copolymer, preferably from 10 to 35 weight %, more preferably from 10 to 28 weight %.

The alkyl (meth)acrylate copolymer can be advantageously used in an amount ranging from about 5 to about 50 wt %. Preferably, the (meth)acrylate copolymer is present in an amount of from about 10 to about 35 wt %. Even more preferably, the (meth)acrylate copolymer is present in an amount of from about 15 to about 30 wt %.

Ethylene copolymers suitable for use herein can be produced by any process—including conventional processes such as via a tubular reactor or via an autoclave—and/or by non-conventional processes. Ethylene/alkyl acrylate copolymers obtained from a tubular reactor are produced at high pressure and elevated temperature in a tubular reactor or the like, wherein the inherent consequences of dissimilar reaction kinetics for the respective ethylene and alkyl acrylate comonomers is alleviated or partially compensated by the intentional introduction of the monomers along the reaction flow path within the tubular reactor. Such copolymers can be obtained commercially from DuPont. Ethylene/alkyl acrylate copolymers produced via an autoclave process can be obtained commercially from Exxon/Mobil, and/or from AtoChem, for example.

The molecular weight, as measured by the melt index, of ethylene/alkyl (meth)acrylate copolymers suitable for use in the practice of the present invention can vary significantly. The specific melt index that is desirable can depend on the balance of properties sought from the organic acid/ethylene/alkyl (meth)acrylate copolymer blend intended to provide the desired mix of oxygen permeability and structural properties needed for a specific packaging film.

For the purposes of the present invention, it is contemplated that component (c) of this invention can be a mixture of components, including mixtures various species of a particular copolymer, so long as the intended use of the blend is not compromised or negated. For example, it is contemplated as within the scope of the present invention that ethylene alkyl (meth)acrylates having various melt indices, or having different alkyl groups, for example, can be utilized as a mixture to fulfill the intended function of component (c) herein.

In another embodiment, component (c) of the blend is an ethylene/vinyl acetate copolymer. The relative amount of the vinyl acetate comonomer incorporated into ethylene/vinyl acetate copolymers can, in principle, vary broadly from a few weight percent up to as high as 40 weight percent of the total copolymer or even higher.

The ethylene/vinyl acetate copolymer preferably has a vinyl acetate unit content of from 2 to 40% by weight, especially from 6 to 30% by weight. The ethylene/vinyl acetate copolymer preferably has a melt flow rate, measured in accordance with ASTM D-1238, of from about 0.1 to about 40 g/10 minutes, and especially from about 0.3 to about 30 g/10 minutes. The ethylene-containing copolymers useful as the third component in the blends described herein can be modified by methods well known in the art, including modification with an unsaturated carboxylic acid or its derivatives, such as maleic anhydride or maleic acid.

A mixture of two or more different ethylene/vinyl acetate copolymers can be used in the multilayer films of the present invention in place of a single copolymer as long as the average values for the comonomer content will be within the range indicated above. Particularly useful properties may be obtained when two or more properly selected ethylene/vinyl acetate copolymers are used in blends of the present invention.

Ethylene/vinyl acetate copolymers are useful in the seal (inside) layer of the present invention because of their low heat seal initiation temperatures. This allows for formation of a good secondary seal between the packaging webs. Mixtures of any suitable ethylene-containing copolymers can also be useful in the practice of the present invention when combined with a neutralized acid copolymer/organic acid mixture to form an oxygen-permeable film.

As indicated hereinabove, multiple layer (multilayer) films of the present invention can be useful in a vacuum packaging application, wherein at least one layer comprises the organic acid modified ionomer and ethylene containing copolymer blend described herein and at least one other layer consisting essentially of an ethylene-containing copolymer.

Examples of ethylene-containing polymers suitable for use as a second polymeric layer in the multilayer film of the present invention include polyethylene homopolymers and copolymers, including LLDPE, LDPE, ULDPE, metallocene polyethylene (mPE); ethylene propylene copolymers; ethylene/propylene/diene monomer (EPDM) copolymers, etc.; and ethylene copolymers derived from copolymerization of ethylene and at least one polar comonomer selected from the group consisting of (meth)acrylic acid, alkyl (meth)acrylate, vinyl acetate, maleic anhydride, maleic acid, maleic acid monoester, and CO (carbon monoxide), wherein copolymers comprising acid groups (e.g. (meth)acrylic acid) optionally are at least partially neutralized. The polar comonomer could also be incorporated through a melt grafting process onto an ethylene containing polymer (i.e. a graft copolymer).

In a preferred embodiment, multilayer films of the present invention comprise at least one layer that consists essentially of an ethylene/vinyl acetate copolymer ethylene/alkyl (meth)acrylate, or mPE.

A film or multilayer film of the present invention can be obtained by any method known for making a film. As such, a film of the present invention can be prepared by coextrusion of the compositions for the various layers as cast films, blown films, extrusion coatings, laminates and the like. Films obtained for use herein can be oriented either axially or biaxially by various methodologies including, for example, blown film, bubble techniques, mechanical stretching or the like.

It should be appreciated that various additives as generally practiced in the art can be present in the respective film layers, provided their presence does not substantially alter the properties of the breathable film or film structure. Thus, it is contemplated that various additives such as antioxidants and thermal stabilizers, ultraviolet (UV) light stabilizers, pigments and dyes, fillers, anti-slip agents, plasticizers, other processing aids, and the like may be advantageously employed. The films of the present invention can be prepared in any form, including flat sheet or tubular form.

When used in a vacuum skin package of this invention, the layer prepared from the ethylene-containing polymer is used as an inside sealant layer.

In some cases, a packaging web may be shaped by, for example, thermoforming to provide receptacles for the package contents. Typically, when a shaped web is used, it is combined with a flat web to form a package of this invention.

EXAMPLES

The Examples herein are provided to illustrate various embodiments of the invention claimed, but are not intended in any way to limit the scope of the claimed invention.

In order to illustrate the enhanced oxygen transmission rates associated with a film layer involving a highly neutralized blend of ionomer, organic acid and ethylene/alkyl (meth)acrylate copolymers, cast films were prepared from the materials listed below. The oxygen permeation value (OPV) was measured for each cast film using a Mocon Ox-tram® 2/21 at 23° C. and 50% relative humidity. The resulting data expressed as a normalized oxygen permeation rate at one mil thickness (mil-cc/m$^2$/24 hour) are presented in Table 1 below. The results show that a film of a highly neutralized blend of ionomer, organic acid and ethylene/alkyl (meth)acrylate copolymers has as much as six times the oxygen permeability value of a film comprising a standard ionomer.

Materials Used

Ionomer-1: An E/15% MAA dipolymer partially neutralized with Mg, having an MI of 0.75.
Ionomer-2: An E/23.5% nBA/9% MAA terpolymer partially neutralized with Mg, having an MI of 0.95.
Ionomer-3: An E/10% MAA dipolymer partially neutralized with Na, having an MI of 1.3.
EMA-1: An E/24% MA dipolymer, having an MI of 2.
EMA-2: An E/24% MA dipolymer, having an MI of 20.
EBA-1: An E/27% nBA dipolymer, having an MI of 4.
EMAA-1: An E/15% methacrylic acid dipolymer, having an MI of 60.
NA-1: a neutralizing agent comprising 50 weight % of Mg(OH)$_2$ blended in a polymer carrier comprised of an E/5% MAA dipolymer with MI of 500.
NA-2: a neutralizing agent comprising 50 weight % Mg(OH)2 blended in a polymer carrier of E/nBA/AA terpolymer.
EVA-1: An E/28% vinyl acetate dipolymer, having an MI of 2.
EBAAA-1: An E/12.5 nBA/10.5 AA terpolymer, having MI of 60
EBAMAA-1: An E/23.5% nBA/9% MAA terpolymer, having MI of 200.

TABLE 1

| Ex. | Resin 1 (weight %) | Resin 2 (weight %) | Resin 3 (weight %) | Organic Acid Salt (weight %) | Neutralizing Agent (weight %) | OPV |
| --- | --- | --- | --- | --- | --- | --- |
| 1 | Ionomer-1 (51.1) | EMA-2 (13.02) | EMAA-1 (11.84) | Mg Stearate (22.04) | NA-1 (2.0) | 20541 |
| 2 | Ionomer-1 (52.36) | EMA-2 (13.2) | EMAA-1 (10) | Mg Stearate (22.45) | NA-1 (1.99) | 35600 |
| 3 | Ionomer-1 (54.5) | EMA-2 (4.87) | EMA-1 (14.6) | Mg Stearate (23.36) | NA-1 (2.68) | 43200 |
| 4 | Ionomer-2 (49) | EBA-1 (30) | none | Mg Stearate (21) | none | 24390 |
| 5 | Ionomer-2 (56) | EBA-1 (20) | none | Mg Stearate (24) | none | 23850 |
| 6 | Ionomer-2 (63) | EBA-1 (10) | none | Mg Stearate (27) | none | 21000 |
| 7 | EBAMAA-1 (47.35) | EBA-1 (29) | none | Mg Stearate (20.3) | NA-2 (3.35) | 29460 |
| 8 | EBAMAA-1 (53.89) | EBA-1 (19.2) | none | Mg Stearate (23.1) | NA-2 (3.81) | 28630 |
| 9 | EBAMAA-1 (60.34) | EBA-1 (9.55) | none | Mg Stearate (25.85) | NA-2 (4.26) | 29795 |
| 10 | EBAMAA-1 (57.8) | EBA-1 (28.9) | none | Mg Stearate (13.5) | NA-2 (3.8) | 30860 |
| 11 | EBAMAA-1 (61.27) | EBA-1 (19.1) | none | Mg Stearate (15.3) | NA-2 (4.33) | 30420 |
| 12 | EBAMAA-1 (68.56) | EBA-1 (9.5) | none | Mg Stearate (17.1) | NA-2 (4.84) | 32620 |
| 13 | Ionomer-1 (58.18) | EMA-2 (14.67) | none | Mg Stearate (24.94) | NA-1 (2.21) | — |
| 14 | Ionomer-1 (55.27) | EMA-2 (13.94) | EMAA-1 (5) | Mg Stearate (23.69) | NA-1 (2.1) | 38606 |
| C1 | Ionomer-3 (100) | none | none | none | none | 7070 |
| C2 | Ionomer-2 (80) | none | none | Mg Stearate (20) | none | 19,090 |

TABLE 1-continued

| Ex. | Resin 1 (weight %) | Resin 2 (weight %) | Resin 3 (weight %) | Organic Acid Salt (weight %) | Neutralizing Agent (weight %) | OPV |
|---|---|---|---|---|---|---|
| C3 | Ionomer-2 (70) | none | none | Mg Stearate (35) | none | 20,990 |
| C4 | Ionomer-2 (90) | none | none | Mg Stearate (10) | none | 19,360 |

Example 15

A coextruded two-layer film was prepared on a Brampton blown film line comprising one layer of EVA-1, nominally 1 mil thick, and one layer, nominally 2 mil thick, comprising a blend of 95 weight % of the resin of Example 13 and 5 weight % of EMAA-1. The operating parameters are listed below.

|  | Extruder X Temperature (° C.) | Extruder Y Temperature (° C.) | Extruder Z Temperature (° C.) | Die Temperature (° C.) |
|---|---|---|---|---|
| Zone 1 | 175 | 175 | 175 | 215 |
| Zone 2 | 190 | 200 | 200 | 215 |
| Zone 3 | 205 | 215 | 215 | 215 |
| Zone 4 | 215 | 215 | 215 | 215 |
| Zone 5 | 215 | — | — | — |
| Resin | EVA-1 | Ex. 13 + EMAA-1 | Ex. 13 + EMAA-1 | |
| Gauge set (mil) | 0.97 | 0.94 | 0.94 | 3.0 ± .25 |

Line Speed = 15 feet per minute;
Blow up ratio = 3 to 1;
Layflat Dimension = 8 inches The resulting film had a final structure of 1.0 mil of EVA-1 and 2.25 mil of Ex. 13+EMAA-1. It had excellent formability, good sealability (using the EVA-1 layer as the sealant layer) and an OTR of 6318 cc/m² day atm.

Example 16

A similar film is prepared using similar processing conditions, comprising one layer of EVA-1 with an OPV of 13,952 mil-cc/m²/24 hour, nominally 0.7 mil thick, and one layer of Example 14, nominally 1.8 mil thick.

This film has similar formability and sealability as Example 15, with a calculated OTR of 10,331 cc/m² day atm.

Example 17

Packages comprising two webs of the film of Example 15 and fresh salmon or flounder pieces were prepared. Pieces of fish were placed on one web of the film and a second web was placed over the fish and overlying the first web on a standard vacuum seal packaging machine. Vacuum was applied and the webs were sealed at 200° F. with a cycle time of 15 seconds. Formability and seal strength were good to excellent.

Example 18

A package is prepared from the Example 16 film using a process similar to that used in Example 15.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A process for improving the storage stability of a fresh food item comprising the step of packaging the food item in a vacuum skin package and removing air by way of a vacuum source prior to sealing the package, the package comprising a gas permeable multilayer film, wherein the multilayer film comprises:

(i) at least one layer comprising a blend of:

(a) one or more aliphatic organic acids or salts thereof having fewer than 36 carbon atoms;

(b) at least one E/X/Y copolymer or ionomer of said E/X/Y copolymer wherein E is derived from ethylene, X is derived from at least one $C_3$ to $C_8$ α,β-ethylenically unsaturated carboxylic acid, and Y is derived from a comonomer selected from the group consisting of alkyl acrylates and alkyl methacrylates, wherein the alkyl groups of said alkyl acrylates and alkyl methacrylates have from 1 to 8 carbon atoms, wherein X is from about 3 to about 30 weight % of said E/X/Y copolymer, and Y is from 0 to about 35 weight % of said E/X/Y copolymer, and wherein greater than 70% of all the total acid moieties from (a) plus (b) are neutralized by adding the stoichiometric amount of a cation source calculated to neutralize the target amount of acid moieties in the acid copolymer and organic acid or acids in the blend, wherein the cation source is selected from the group consisting of alkaline metals, alkaline earth metals, and transition metals; and (c) at least one additional ethylene-containing polymer selected from the group consisting of ethylene homopolymers, ethylene copolymers and mixtures thereof; with the proviso that said at least one additional ethylene-containing copolymer is other than an ethylene acid copolymer or an ionomer of an ethylene acid copolymer; and (ii) at least one polymeric layer consisting essentially of at least one ethylene-containing polymer or a mixture of ethylene-containing polymers.

2. The process of claim 1 further comprising the step of placing a plurality of the vacuum skin packages in a gas impermeable pouch and sealing said pouch to provide a gas-impermeable atmosphere for the packages.

3. The process of claim 2 further comprising the step of providing a controlled atmosphere inside of the pouch.

4. The process of claim 3 wherein the controlled atmosphere is a vacuum.

5. The process of claim 3 wherein the controlled atmosphere is a gas or gas mixture.

6. The process of claim 5 wherein the controlled atmosphere comprises a gas selected from the group consisting of nitrogen, carbon dioxide, and oxygen.

* * * * *